United States Patent
Matsuura et al.

[11] Patent Number: 5,993,364
[45] Date of Patent: Nov. 30, 1999

[54] APPARATUS FOR TIGHTENING CONNECTING ROD ATTACHMENT MEMBERS

[75] Inventors: Junichi Matsuura, Higashimatsuyama; Toshinori Takeyasu, Nagoya, both of Japan

[73] Assignees: Honda Giken Kogyo Kabushiki Kaisha, Tokyo; Sanyo Machine Works, Ltd., Aichi-ken, both of Japan

[21] Appl. No.: 09/126,136

[22] Filed: Jul. 30, 1998

[30] Foreign Application Priority Data

Aug. 7, 1997 [JP] Japan .................................. 9-213237

[51] Int. Cl.⁶ .......................... B23Q 3/155; B23Q 17/00
[52] U.S. Cl. .......................... 483/16; 29/795; 29/888.01; 483/13; 483/69
[58] Field of Search ................. 483/16, 13, 69, 483/1; 29/795, 252, 281.1, 888.2, 88.01

[56] References Cited

U.S. PATENT DOCUMENTS

| | | | |
|---|---|---|---|
| 3,813,755 | 6/1974 | Maskell et al. | 29/252 |
| 3,952,393 | 4/1976 | Ravenzwaay et al. | 29/795 |
| 4,581,812 | 4/1986 | Yamanaga et al. | 483/62 X |
| 4,701,954 | 10/1987 | Noh et al. | 483/65 X |
| 4,759,108 | 7/1988 | Scharlacken et al. | 29/888.2 |
| 4,928,377 | 5/1990 | Schulte | 29/560 |
| 5,065,507 | 11/1991 | Wakamori et al. | 29/888.01 |
| 5,189,785 | 3/1993 | Inoguchi et al. | 29/809 |

FOREIGN PATENT DOCUMENTS

| | | |
|---|---|---|
| 63-21531 | 2/1988 | Japan . |
| 4136630 | 12/1992 | Japan . |
| 5318241 | 3/1993 | Japan . |

*Primary Examiner*—William Briggs
*Attorney, Agent, or Firm*—Birch, Stewart, Kolasch & Birch, LLP

[57] ABSTRACT

An apparatus for tightening connecting rod attachment members comprises a rotating mechanism for rotating and positioning a crankshaft about a center of its shaft section, angular deflecting mechanisms for deflecting nut runners about the center of the shaft section, axial displacement mechanisms for displacing the nut runners in an axial direction of the crankshaft, and inter-axis displacement mechanisms for making mutual approach or separation for a distance between the pair of nut runners and a distance between the pair of nut runners. The nut runners are operated to fasten a connecting rod to the crankshaft. Accordingly, one tightening apparatus can be used to tighten the connecting rod attachment members to the crankshaft even when the type of the crankshaft is changed. The tightening apparatus is applicable to a production line for carrying multiple types in a mixed manner.

10 Claims, 13 Drawing Sheets

APPARATUS FOR TIGHTENING CONNECTING ROD ATTACHMENT MEMBERS

BACKGROUND OF THE INVENTION

1. Field of the Invention

The present invention relates to an apparatus for tightening connecting rod attachment members for fastening bolts or nuts as the attachment members in order to attach a connecting rod to a crankshaft.

2. Description of the Related Art

A multi-spindle nut runner apparatus, which is disclosed, for example, in Japanese Laid-Open Utility Model Publication No. 63-21531, has been hitherto used when a connecting rod is fastened with bolts or nuts to a crankshaft for constructing an engine. Such a multi-spindle nut runner apparatus is operated as follows in order to join the connecting rod by being fastened with nuts with respect to a plurality of pin sections of the crankshaft. That is, a nut runner socket corresponding to the pin sections disposed on a side of the top dead center of the crankshaft is allowed to make abutment prior to a nut runner socket corresponding to the pin sections disposed on the bottom dead center. The force of abutment, which is exerted by the nut runner socket on the pin sections disposed on the side of the top dead center, is used to intercept the rotation of the crankshaft. In this state, the connecting rod is joined by the aid of all of the pin sections of the crankshaft.

Japanese Laid-Open Patent Publication No. 5-318241 discloses a pitch change mechanism for a multi-spindle nut runner apparatus comprising a plurality of nut runner spindles incorporated into a sliding member. A driven member, which is provided on the sliding member, is engaged with a cam groove of a cam. Displacement of the cam causes the plurality of nut runner spindles to make mutual approach or separation by the aid of the driven member and the sliding member so that a plurality of bolts or nuts are simultaneously tightened.

Japanese Laid-Open Utility Model Publication No. 4-136630 discloses a nut runner pitch-adjusting mechanism for nut runner holders. The nut runner pitch-adjusting mechanism is arranged as follows. That is, guide blocks are provided on a pair of guide rails which make intersection at a center of the nut runner holders. The pitch of the nut runners is changed by moving the guide blocks along the guide rails.

However, in the case of the conventional technique described above, for example, when the type of the crankshaft is changed from a crankshaft of the L-type engine to a crankshaft of the V-type engine, it is necessary to change not only the spacing distance of the attachment members for attaching the connecting rod to the crankshaft, but also the attachment angle and the spacing distance between the connecting rod and another adjacent connecting rod. Further, it is necessary to exchange the tightening apparatus corresponding to the type of each of the engines. Therefore, problems arise in that the exchange operation is complicated, the time required for the operation is prolonged, and the production cost becomes expensive.

SUMMARY OF THE INVENTION

A general object of the present invention is to provide an apparatus for tightening connecting rod attachment members, which makes it possible to attach a connecting rod to a crankshaft by using the one apparatus even when the type of the engine is changed, and which is applicable to a production line for carrying multiple types in a mixed manner.

A principal object of the present invention is to provide an apparatus for tightening connecting rod attachment members, which makes it possible to attach connecting rods to crankshafts of different types by rotating and positioning a crankshaft about a center of its shaft section by means of a rotating mechanism, displacing a pair of nut runners in an axial direction of the crankshaft by means of an axial displacement mechanism, rotating the pair of nut runners by predetermined angles about the center of the shaft section of the crankshaft by means of an angular deflecting mechanism, displacing the pair of nut runners in directions to make mutual approach or separation by means of an inter-axis displacement mechanism, and exchanging sockets to be installed to the nut runners by means of a socket exchange mechanism.

Another object of the present invention is to provide a connecting rod-tightening apparatus which makes it possible to simultaneously tightening a plurality of pairs of connecting rod attachment members by providing a plurality of pairs of the nut runners.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
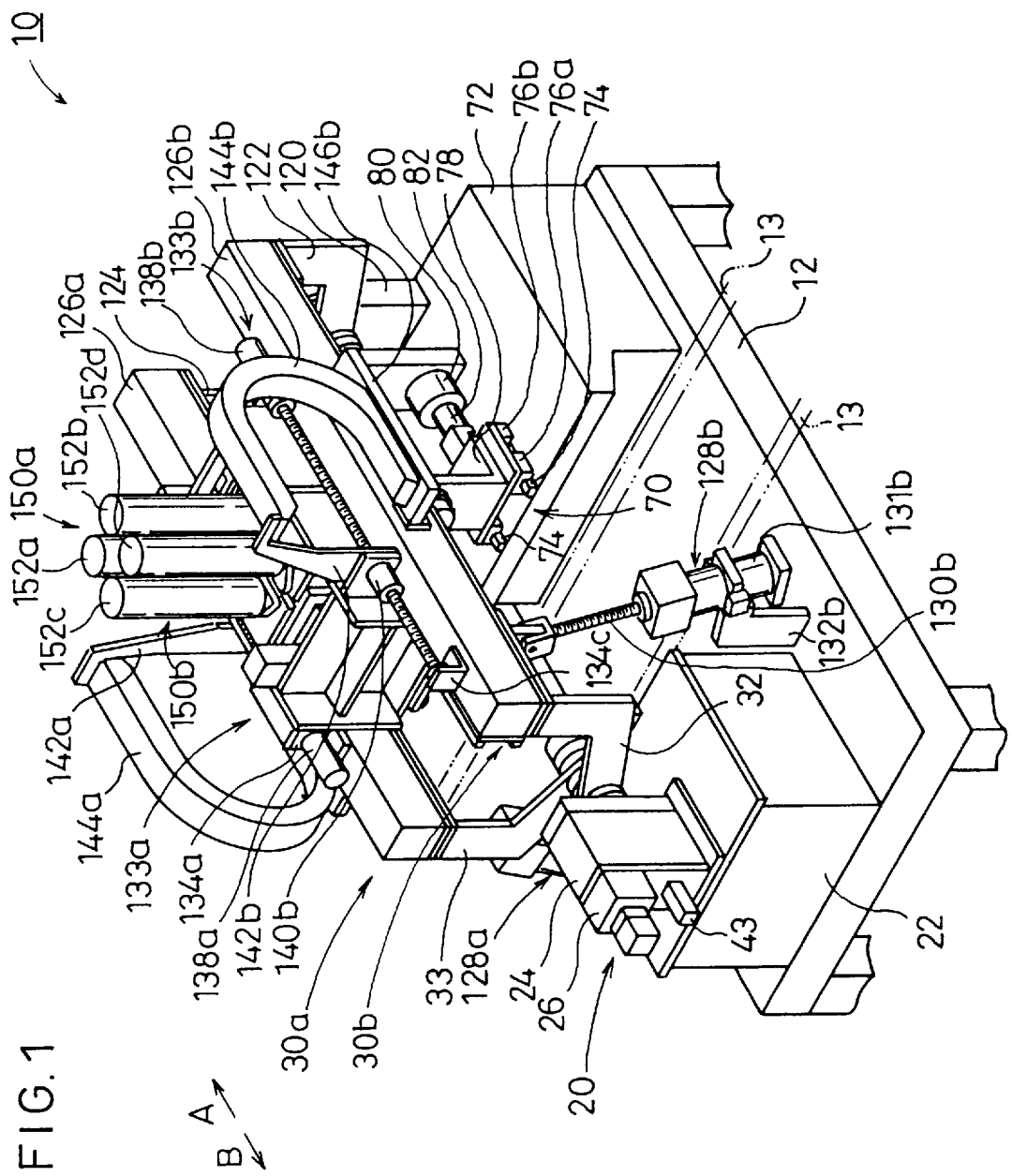
FIG. 1 shows a perspective view illustrating an apparatus for tightening connecting rod attachment members according to an embodiment of the present invention.
Figure 2:
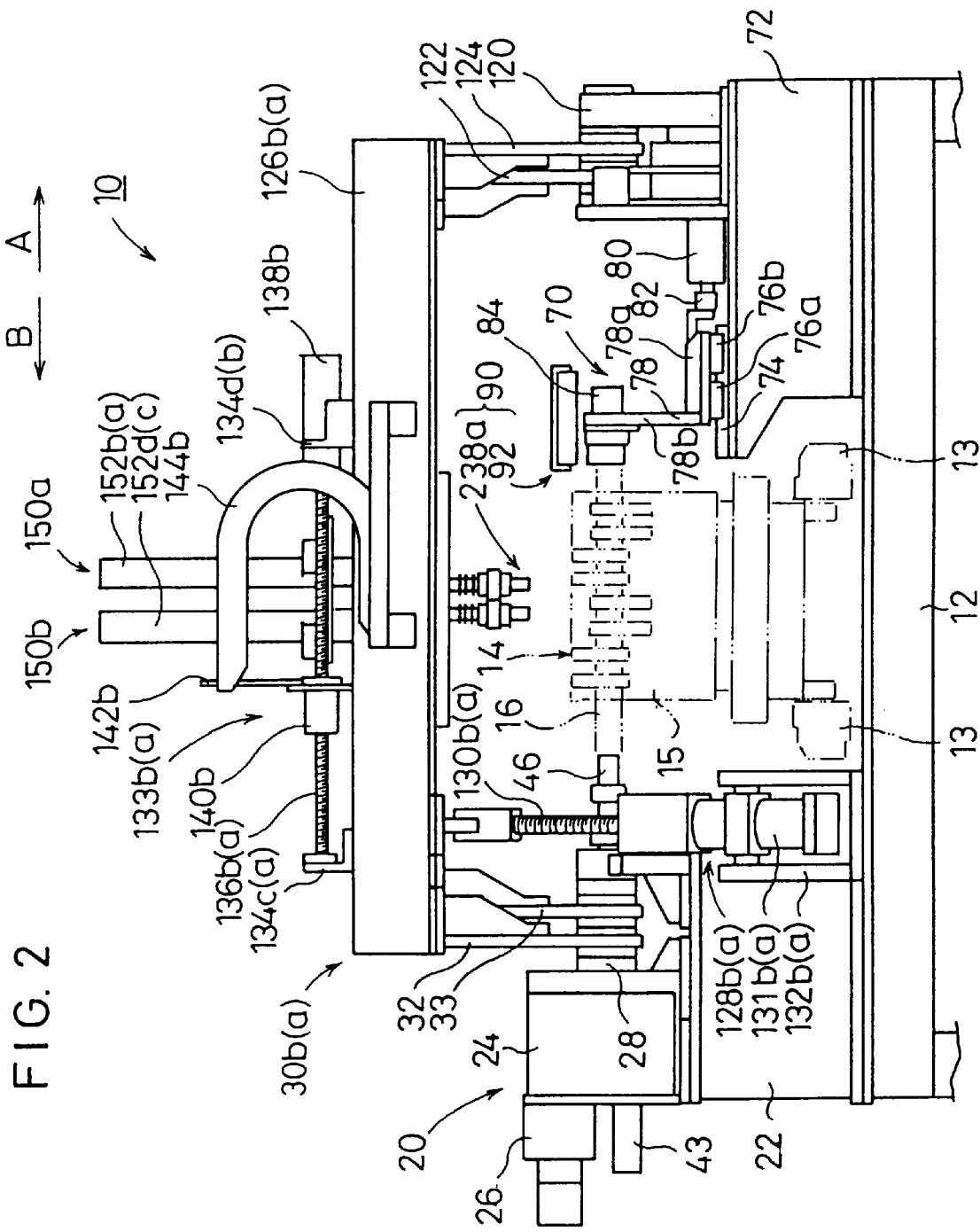
FIG. 2 shows a side view of the tightening apparatus shown in FIG. 1.

With reference to FIGS. 1 to 4, reference numeral 10 indicates an apparatus for tightening connecting rod attachment members according to an embodiment of the present invention. The apparatus 10 for tightening connecting rod attachment members includes a lengthy table 12. As shown in FIG. 2, a cylinder block 15 as a workpiece is conveyed onto the table 12 by the aid of conveyer rails 13. In the cylinder block 15, pin sections of a crankshaft 14 are arranged with respect to large ends of unillustrated connecting rods. A rotating mechanism 20 for supporting a first end of a shaft section 16 of the crankshaft 14 and controlling rotation of the crankshaft 14 is provided on a first end side of the table 12. The rotating mechanism 20 includes a gear box 24 secured to a top of a pedestal member 22. A servomotor 26 as a rotary driving source is disposed at a first end of the gear box 24.

Figure 5:
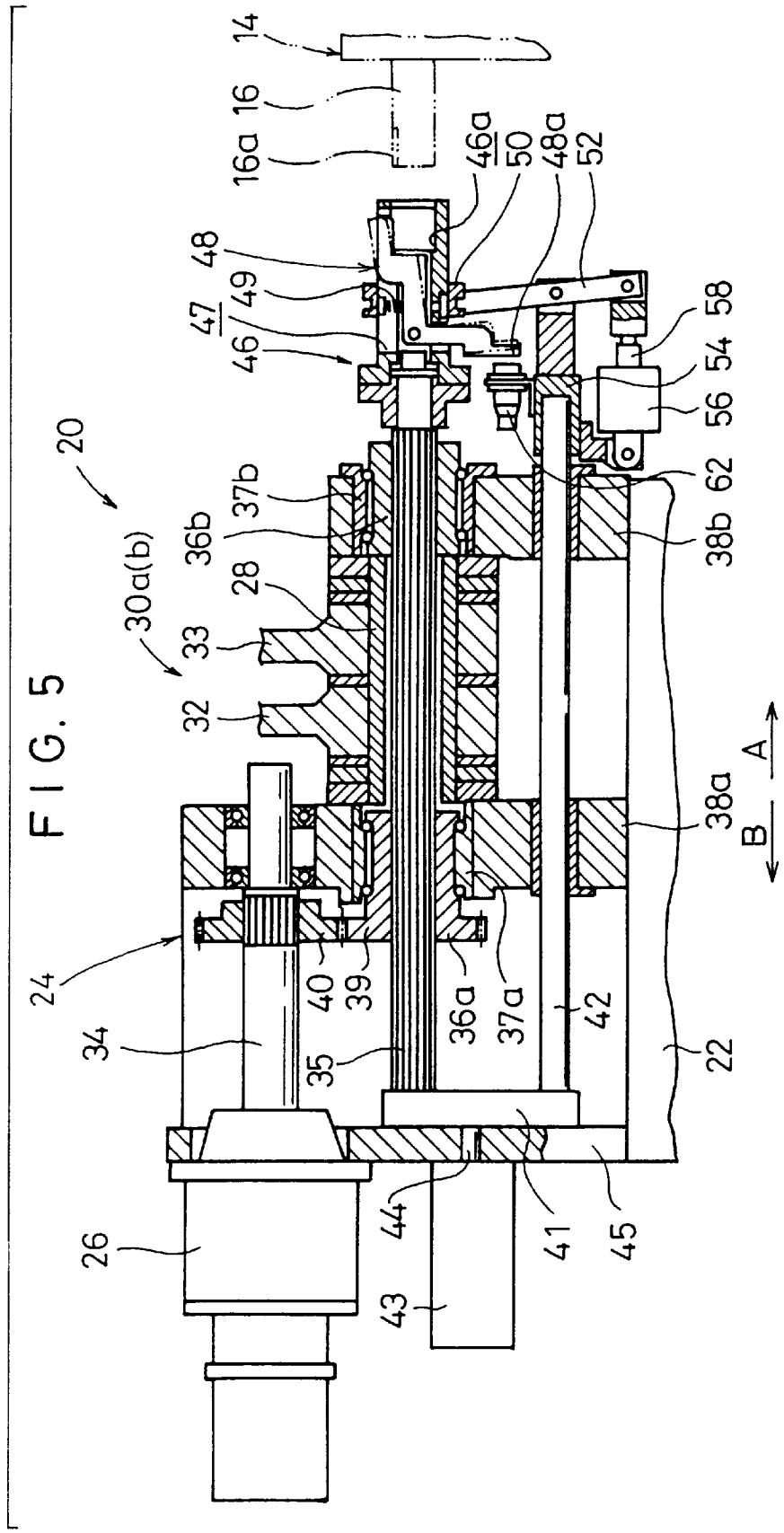
FIG. 5 shows a partially cross-sectional, magnified side view of a rotating mechanism of the tightening apparatus shown in FIG. 1.

As shown in FIG. 5, a spline shaft 35, which is inserted into a cylindrical member 28, is disposed in parallel to a rotary shaft 34 of the servomotor 26, in the gear box 24. Arm members 32, 33, which construct an angular deflecting mechanism 30a, 30b described later on, are rotatably arranged on the cylindrical member 28. The spline shaft 35 penetrates through substantially cylindrical gear members 36a, 36b having teeth formed on their inner circumferences for engaging with the spline shaft 35. The gear members 36a, 36b are rotated together with the spline shaft 35. The spline shaft 35 is slidable in the axial direction (directions indicated by the arrows A and B) with respect to the gear members 36a, 36b. The gear members 36a, 36b are rotatably supported on support members 38a, 38b by the aid of bearing members 37a, 37b. A gear 39 is formed on an outer circumference of one of the gear members 36a. The gear 39 is meshed with a gear 40 formed on the rotary shaft 34. Thus, the rotary motion of the rotary shaft 34 is transmitted to the spline shaft 35 via the gear member 36a. A first end of the spline shaft 35 is rotatably supported by a displacement plate 41. A rod member 42 is secured to the displacement plate 41 in parallel to the spline shaft 35. A cylinder rod 44 of a cylinder 43 is secured to the displacement plate 41. The cylinder 43 is secured to a support plate 45 provided vertically on the pedestal member 22.

An engaging member 46 for engaging with the end of the shaft section 16 of the crankshaft 14 is secured to the second end of the spline shaft 35. The engaging member 46 has a hole 46a for engaging with the shaft section 16 of the crankshaft 14, and it has a slit 47 defined along its axial direction. An engaging pawl 48, which is formed in a bending manner, is disposed in the engaging member 46. A first end of the engaging pawl 48 is displaceable inwardly or outwardly with respect to the engaging member 46 by the aid of the slit 47. The engaging pawl 48 is always urged toward the hole 46a by the aid of a spring member 49, and it is bent to form an end 48a.

A ring-shaped lock member 50 is slidably engaged with the outer circumference of the engaging member 46. One end of a swinging member 52 is rotatably disposed on the lock member 50. The swinging member 52 is rotatably supported, at its substantially central portion, by an end of the rod member 42 by the aid of an attachment member 54.

A cylinder rod 58 of a cylinder 56 is rotatably disposed at the other end of the swinging member 52. The cylinder 56 is supported by the attachment member 54. When the cylinder 56 is operated to displace the cylinder rod 58 in the direction of the arrow B, the lock member 50 is displaced in the direction of the arrow A by the aid of the swinging member 52 to engage the lock member 50 with the engaging pawl 48. Thus, the engaging pawl 48 is prevented from protrusion outwardly from the engaging member 46.

The attachment member 54 is provided with a proximity switch 62. An end 48a of the engaging pawl 48 is capable of making approach and separation with respect to the proximity switch 62. When the end 48a approaches the proximity switch 62 as illustrated by solid lines in FIG. 5, the proximity switch 62 generates a signal which indicates a locked state of the crankshaft 14.

As shown in FIG. 2, a support mechanism 70 is provided opposingly to the rotating mechanism 20, at a second end of the table 12. The support mechanism 70 has rail members 74 secured to the top of a pedestal member 72. Guide members 76a, 76b are slidably provided on the rail members 74. The guide members 76a, 76b are secured to a displacement member 78 formed to have a substantially L-shaped configuration. A horizontal section 78a of the displacement member 78 is connected to a cylinder rod 82 of a cylinder 80 secured to the pedestal member 72. An engaging member 84 is rotatably provided on a perpendicular section 78b of the displacement member 78. The engaging member 84 is engageable with a second end of the shaft section 16 of the crankshaft 14.

Figure 6:
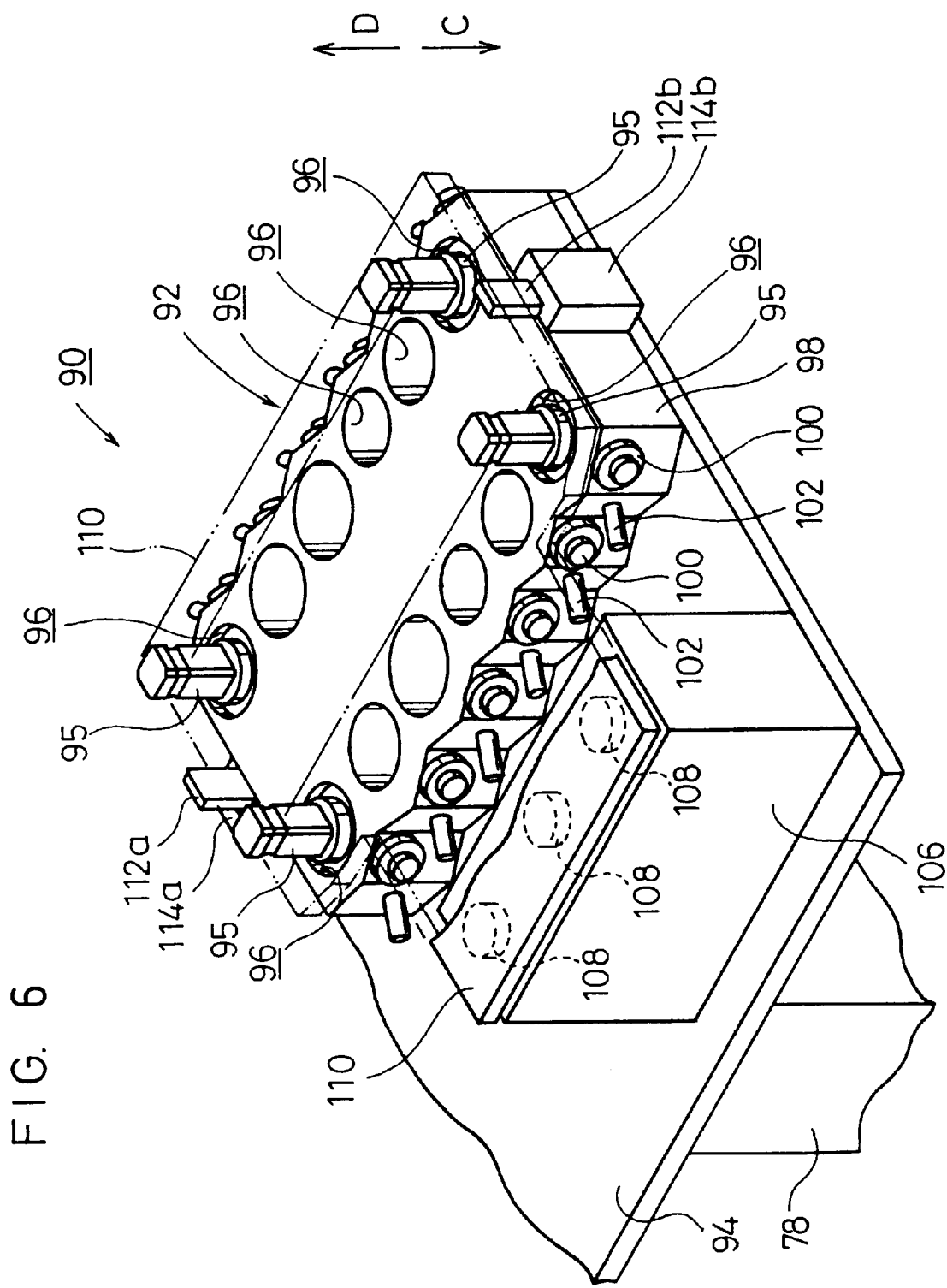
FIG. 6 shows a perspective view of a socket-holding mechanism of the tightening apparatus shown in FIG. 1.

A socket-holding unit 92, which forms a part of a socket exchange mechanism 90, is disposed over the perpendicular section 78b of the displacement member 78. As shown in FIG. 6, the socket-holding unit 92 has a support plate 94 secured to the top of the displacement member 78. A socket-accommodating member 98, which is defined with a plurality of holes 96 for accommodating sockets 95 therein, is secured to the support plate 94. An outer wall section of the socket-accommodating member 98 is formed to have a peak-valley configuration. A ball notch 100 and a proximity sensor 102 are provided corresponding to each of the plurality of holes 96. A ball 104, Which is protrudable toward the inside of the hole 96, is provided in the ball notch 100 (see FIG. 7). The ball 104 is engageable with a groove 99 defined on the outer circumference of the socket 95. A recess 105 for engaging with a connecting rod bolt described later on is defined at a lower portion of the socket 95. The recess 105 engages with a projection 107 formed on the support plate 94. A prism-shaped fitting section 101 is formed at an upper portion of the socket 95. A groove 103 is defined around the circumference of the fitting section 101.

Figure 7:
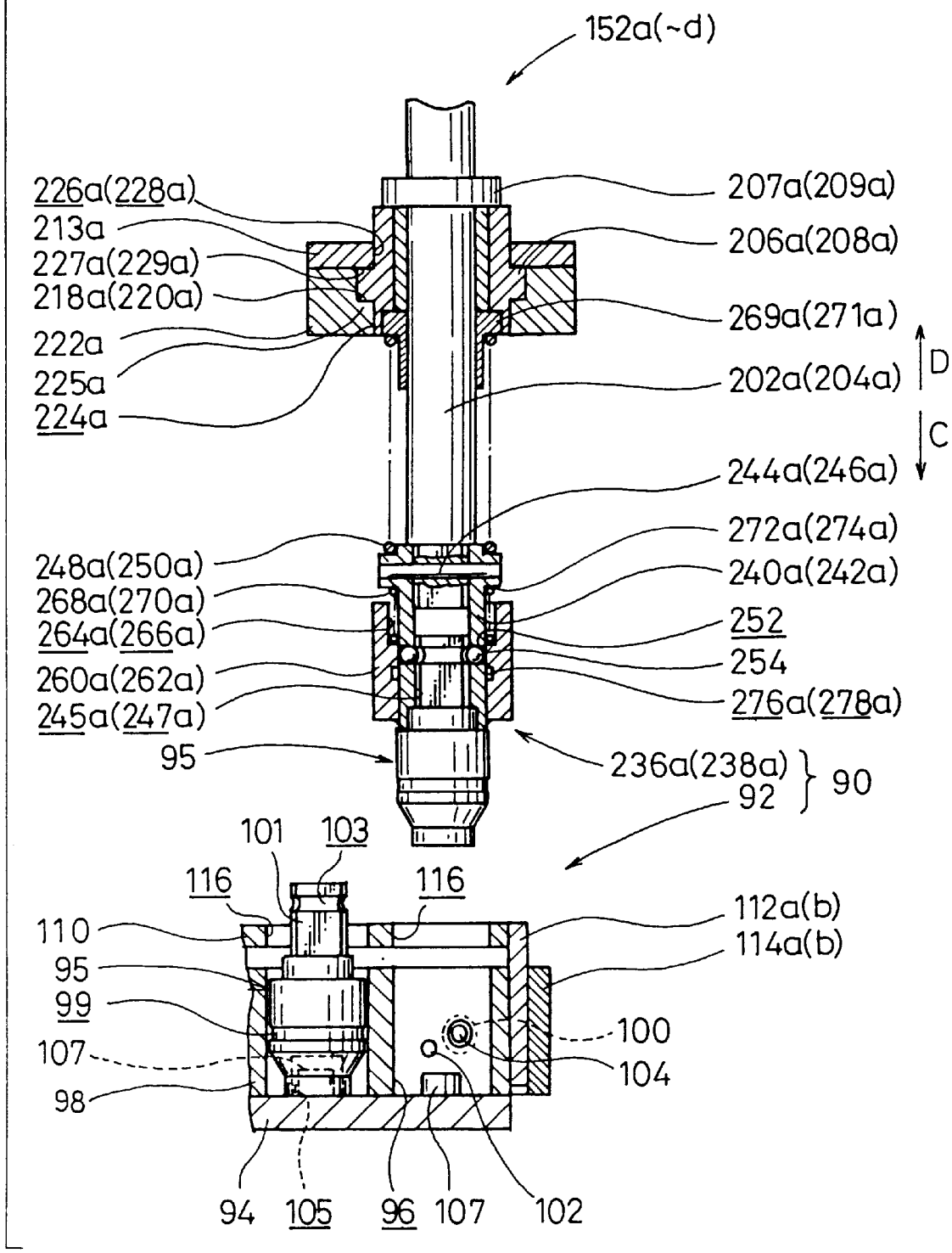
FIG. 7 shows a partially magnified, vertical cross-sectional view of a socket exchange mechanism of the tightening apparatus shown in FIG. 1.

As shown in FIG. 6, a cylinder 106 is secured to the support plate 94. A plate-shaped disengaging member 110 is secured in parallel to the support plate 94 to a plurality of cylinder rods 108 for constructing the cylinder 106. Guide rails 112a, 112b, which extend in the vertical direction, are secured to both side portions of the disengaging member 110. The guide rails 112a, 112b are inserted into guide members 114a, 114b which are secured to the socket-accommodating member 98. As shown in FIG. 7, the disengaging member 110 is defined with a plurality of holes 116 corresponding to the plurality of holes 96 of the socket-accommodating member 98. The sockets 95 are feasibly inserted into the holes 116.

Figure 4:
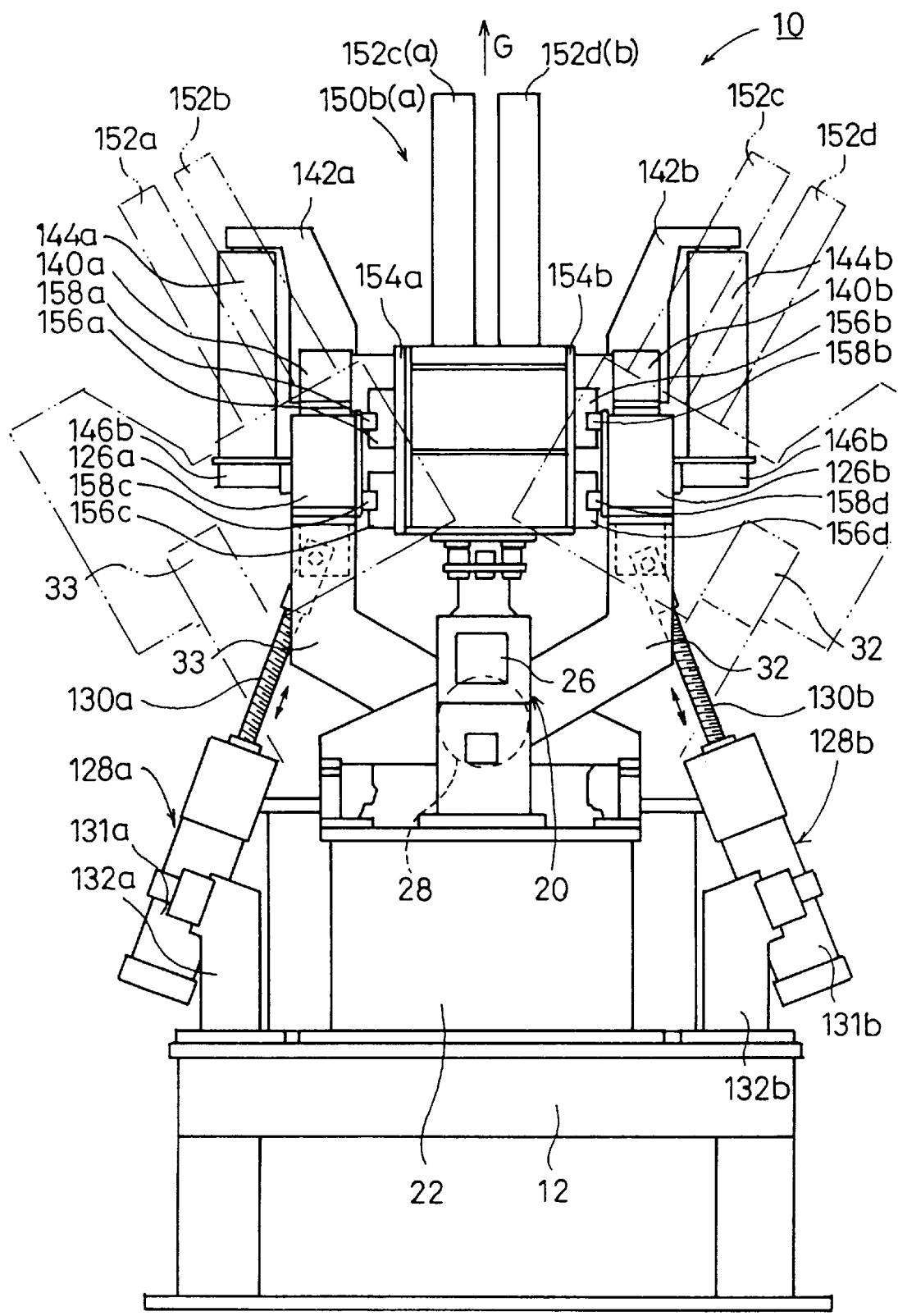
FIG. 4 shows a front view of the tightening apparatus shown in FIG. 1.

As shown in FIGS. 1 and 2, arm members 122, 124, which construct the angular deflecting mechanisms 30a, 30b, are provided rotatably and coaxially with respect to the engaging member 84 via a support shaft member 120 at the end of the pedestal member 72. The arm members 33, 122 are bridged with a frame 126a, while the arm members 32, 124 are bridged with a frame 126b. As shown in FIG. 4, ball screws 130a, 130b for constructing linear actuators (arm-deflecting mechanisms) 128a, 128b are rotatably connected to the respective frames 126a, 126b. The linear actuators 128a, 128b are supported swingably by support members 132a, 132b secured to the table 12. The linear actuators 128a, 128b are provided with servomotors 131a, 131b. When the servomotors 131a, 131b are operated, the ball screws 130a, 130b make forward and backward displacement in the axial direction.

Figure 3:
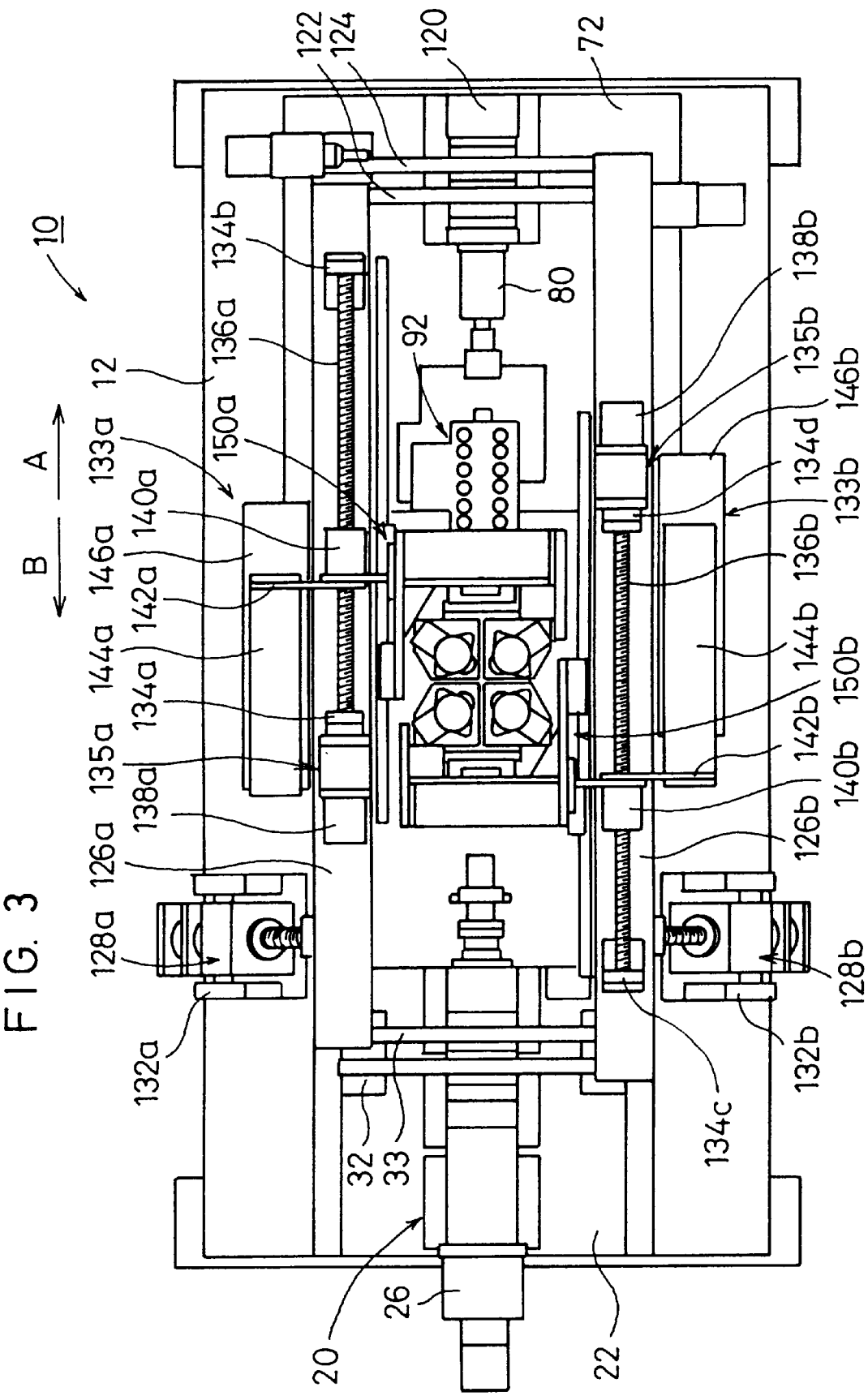
FIG. 3 shows a plan view of the tightening apparatus shown in FIG. 1.

As shown in FIG. 3, axial displacement mechanisms 133a, 133b are disposed on the frames 126a, 126b. The axial displacement mechanisms 133a, 133b include linear actuators 135a, 135b secured along the longitudinal direction of the frames 126a, 126b. The linear actuators 135a, 135b have ball screws 136a, 136b provided rotatable by the aid of holding plates 134a to 134d. The ball screws 136a, 136b are connected to rotary shafts of servomotors 138a, 138b as rotary driving sources secured to the holding plates 134a, 134d respectively. The ball screws 136a, 136b are provided with displacement members 140a, 140b. When the ball screws 136a, 136b are rotated, the displacement members 140a, 140b are displaced in the direction of the arrow A or B.

As shown in FIGS. 1 and 4, plate-shaped members 142a, 142b, which are formed in a bending manner, are secured to the displacement members 140a, 140b. First ends of bendable cable guides 144a, 144b are secured to the ends of the plate-shaped members 142a, 142b. Second ends of the cable guides 144a, 144b are secured to the frames 126a, 126b by the aid of support plates 146a, 146b. For example, compressed air supply pipes and cables for transmitting electric signals are installed at the inside of the cable guides 144a, 144b.

Figure 8:
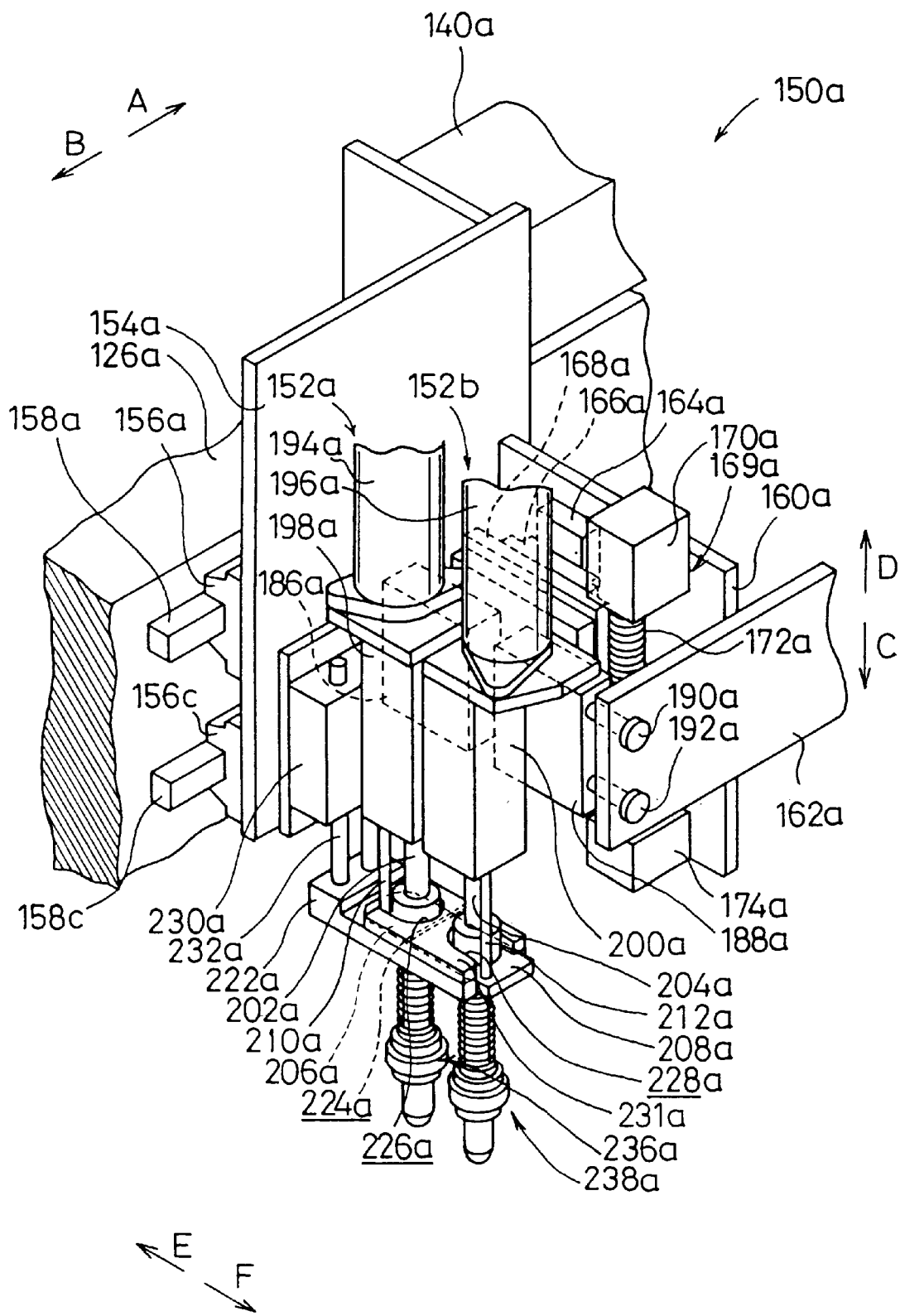
FIG. 8 shows a partially magnified perspective view of an inter-axis displacement mechanism shown in FIG. 1.

As shown in FIGS. 4 and 8, base plates 154a, 154b, which extend perpendicularly, are secured to the displacement members 140a, 140b. Guide members 156a to 156d are secured to the base plates 154a, 154b on their surfaces opposing to the frames 126a, 126b respectively. The guide members 156a to 156d are slidably engaged with the rail members 158a to 158d. Therefore, the displacement members 140a, 140b are displaceable in the direction of the arrow A or B along the rail members 158a to 158d.

Inter-axis displacement mechanisms 150a, 150b are provided on the displacement members 140a, 140b. One of the inter-axis displacement mechanisms 150a includes a pair of nut runners 152a, 152b, and the other inter-axis displacement mechanism 150b includes a pair of nut runners 152c, 152d.

One of the inter-axis displacement mechanisms 150a will be explained in detail with reference to FIG. 8. Components or parts of the other inter-axis displacement mechanism 150b constructed in the same manner as the inter-axis displacement mechanism 150a are designated by the same reference numerals affixed with a symbol "b", detailed explanation of which will be omitted.

Figure 9:
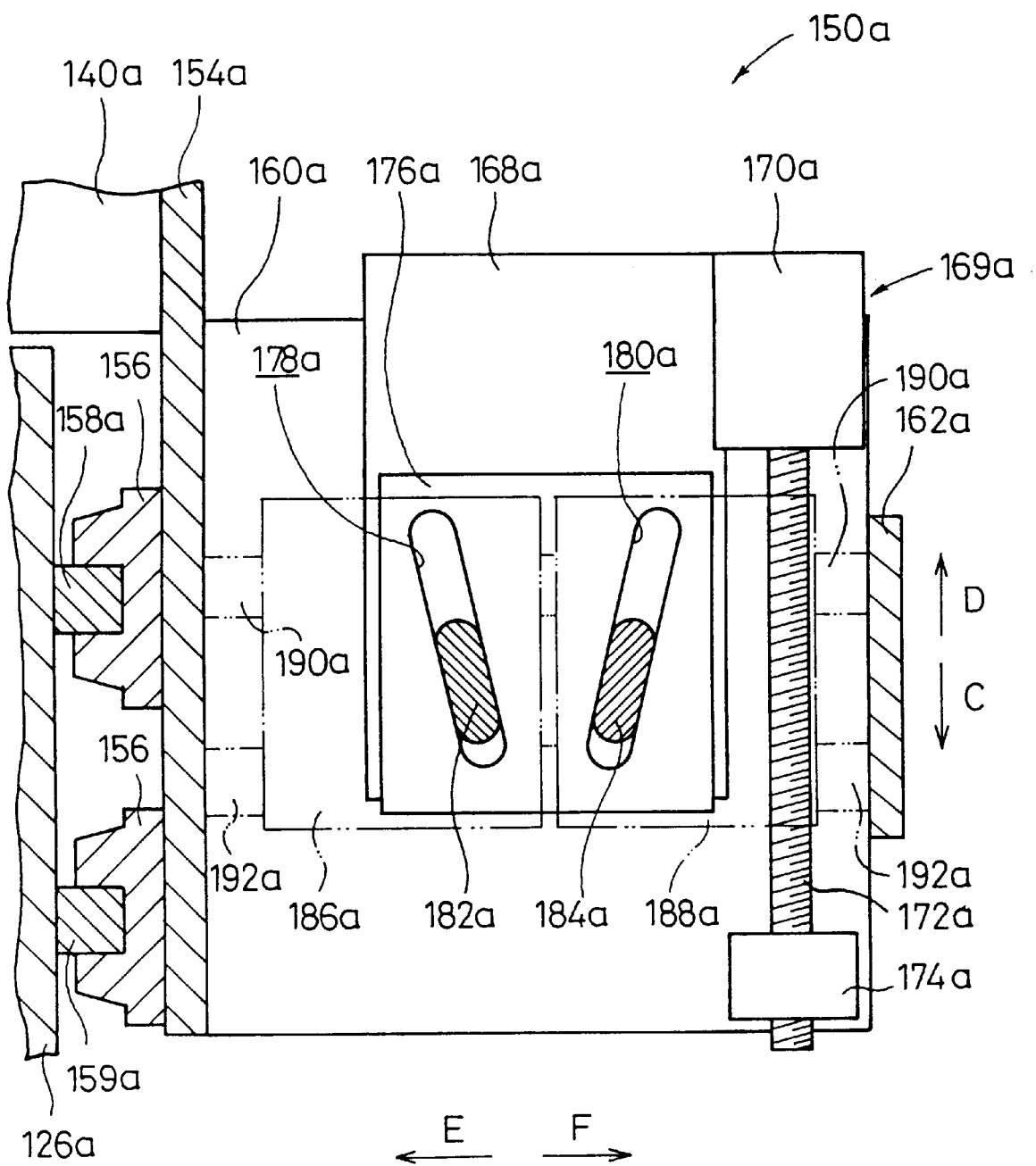
FIG. 9 shows a partially cross-sectional, magnified front view of a cam structure of the inter-axis displacement mechanism shown in FIG. 8.

The inter-axis displacement mechanism 150a has a holding plate 160a which is disposed perpendicularly with respect to the base plate 154a. A plate-shaped member 162a is secured in parallel to the base plate 154a at an end of the holding plate 160a. A rail member 164a, which extends in the vertical direction, is secured to the holding plate 160a. A guide member 166a is slidably engaged with the rail member 164a. A linear actuator 169a, which constructs a cam displacement mechanism, is secured via a plate-shaped member 168a to the guide member 166a. The linear actuator 169a has a servomotor 170a. As shown in FIG. 9, a ball screw 172a is coaxially attached to a rotary shaft of the servomotor 170a. The ball screw 172a is engaged with a displacement member 174a. The displacement member 174a is secured to the holding plate 160a. Accordingly, when the servomotor 170a is operated to rotate the ball screw 172a, the plate-shaped member 168a, which is secured to the servomotor 170a, is displaced in the direction of the arrow C or D.

A cam plate 176a is secured to the plate-shaped member 168a. Lengthy cam holes 178a, 180a are defined through the cam plate 176a, and they are mutually inclined by predetermined angles. Cam members 182a, 184a are engaged with wall sections of the cam holes 178a, 180a. The cam members 182a, 184a are secured to guide members 186a, 188a respectively. Guide bars 190a, 192a, which extend in the horizontal direction, are slidably inserted into the guide members 186a, 188a. The base plate 154a and the plate-shaped member 162a are bridged with the guide bars 190a, 192a. Therefore, when the cam plate 176a is displaced in the direction of the arrow C, then the cam members 182a, 184a are guided by the wall sections which form the cam holes 178a, 180a, and they are displaced in directions to make separation from each other. Thus, the guide member 186a and the guide member 188a are separated from each other. On the other hand, when the cam plate 176a is displaced in the direction of the arrow D, the guide member 186a and the guide member 188a mutually make approach.

As shown in FIG. 8, the nut runners 152a, 152b described above are secured to the guide members 186a, 188a respectively. The rotary driving force is transmitted to the respective nut runners 152a, 152b from unillustrated rotary transmission mechanisms accommodated in cylindrical sections 194a, 196a respectively. The rotary driving force is transmitted to rotary shafts 202a, 204a via gear boxes 198a, 200a. The rotary shafts 202a, 204a are vertically movable through the gear boxes 198a, 200a respectively.

As shown in FIG. 7, the rotary shafts 202a, 204a are slidably inserted into guide members 206a, 208a respectively. Flange members 207a, 209a, which are secured to the rotary shafts 202a, 204a, feasibly make abutment against the top portions of the guide members 206a, 208a.

As shown in FIG. 8, guide bars 210a, 212a are provided in an upstanding manner on the guide members 206a, 208a. The guide bars 210a, 212a are slidably inserted into unillustrated holes which are defined to extend vertically through the gear boxes 198a, 200a.

The guide members 206a, 208a are engaged with substantially U-shaped slits 224a defined on a holding plate 222a. Explanation will be made in detail below with reference to FIG. 7. The guide members 206a, 208a are formed with step sections 218a, 220a, while the walls for forming the slits 224a are formed with step sections 225a. The step sections 218a, 220a are engaged with the step sections 225a to restrict downward displacement of the guide members 206a, 208a. A guide plate 231a, which is formed to have a substantially H-shaped configuration, is secured to the top of the holding plate 222a. Step sections 227a, 229a of the guide members 206a, 208a are engaged with wall sections for forming recesses 226a, 228a of the guide plate 231a to restrict upward displacement of the guide members 206a, 208a. The guide members 206a, 208a are guided in the direction of the arrow E or F by means of the slits 224a and the recesses 226a, 228a (see FIG. 8). The holding plate 222a is secured to a cylinder rod 232a of a cylinder 230a. The cylinder 230a is secured to the base plate 154a. Therefore, when the cylinder 230a is operated, the rotary shafts 202a, 204a are displaced in the direction of the arrow C or D.

Chucks 236a, 238a for constructing the socket exchange mechanism 90 are disposed at the lower ends of the rotary shafts 202a, 204a. As shown in FIG. 7, the chucks 236a, 238a are provided with fitting members 240a, 242a secured to the lower ends of the rotary shafts 202a, 204a. The fitting members 240a, 242a are prevented from disengagement from the rotary shafts 202a, 204a by the aid of pin members 244a, 246a. Prism-shaped holes 245a, 247a for fitting the fitting sections 101 of the sockets 95 thereto are defined in the fitting members 240a, 242a.

First ends of coil springs 248a, 250a are seated on the top portions of the fitting members 240a, 242a. Second ends of the coil springs 248a, 250a are seated on seating members 269a, 271a secured to the bottom portions of the guide members 206a, 208a. Therefore, the chucks 236a, 238a are always urged in the direction of the arrow C. A plurality of holes 252 are defined in the fitting members 240a, 242a. Ball members 254 are fitted to the holes 252 respectively.

The fitting members 240a, 242a are slidably inserted into collar members (holding members) 260a, 262a each of which is formed to have a cylindrical configuration. Recesses 264a, 266a are defined on the top portions of the collar members 260a, 262a. First ends of coil springs 268a, 270a are seated on the bottoms for forming the recesses 264a, 266a. Second ends of the coil springs 268a, 270a are seated on step sections 272a, 274a formed on the fitting members 240a, 242a. Inscribing grooves 276a, 278a are defined on the inner circumferences of the collar members 260a, 262a. When the collar members 260a, 262a are displaced in the direction of the arrow D, the grooves 276a, 278a communicates with the holes 252.

The apparatus 10 for tightening connecting rod attachment members according to the embodiment of the present invention is basically constructed as described above. Next, its operation will be explained.

At first, the cylinder block 15 installed with the crankshaft 14 is conveyed onto the table 12 by the aid of the conveyer rails 13 (see FIG. 2). In this case, a palette for holding the cylinder block 15 is provided with an ID tag (not shown) corresponding to the type of the conveyed cylinder block 15. The type of the engine is distinguished by reading the ID tag by using an unillustrated reader. The rotating mechanism 20, the angular deflecting mechanisms 30a, 30b, the axial displacement mechanisms 133a, 133b, the inter-axis displacement mechanisms 150a, 150b, and the socket exchange mechanism 90 are controlled corresponding to the distinguished type.

Figure 12:
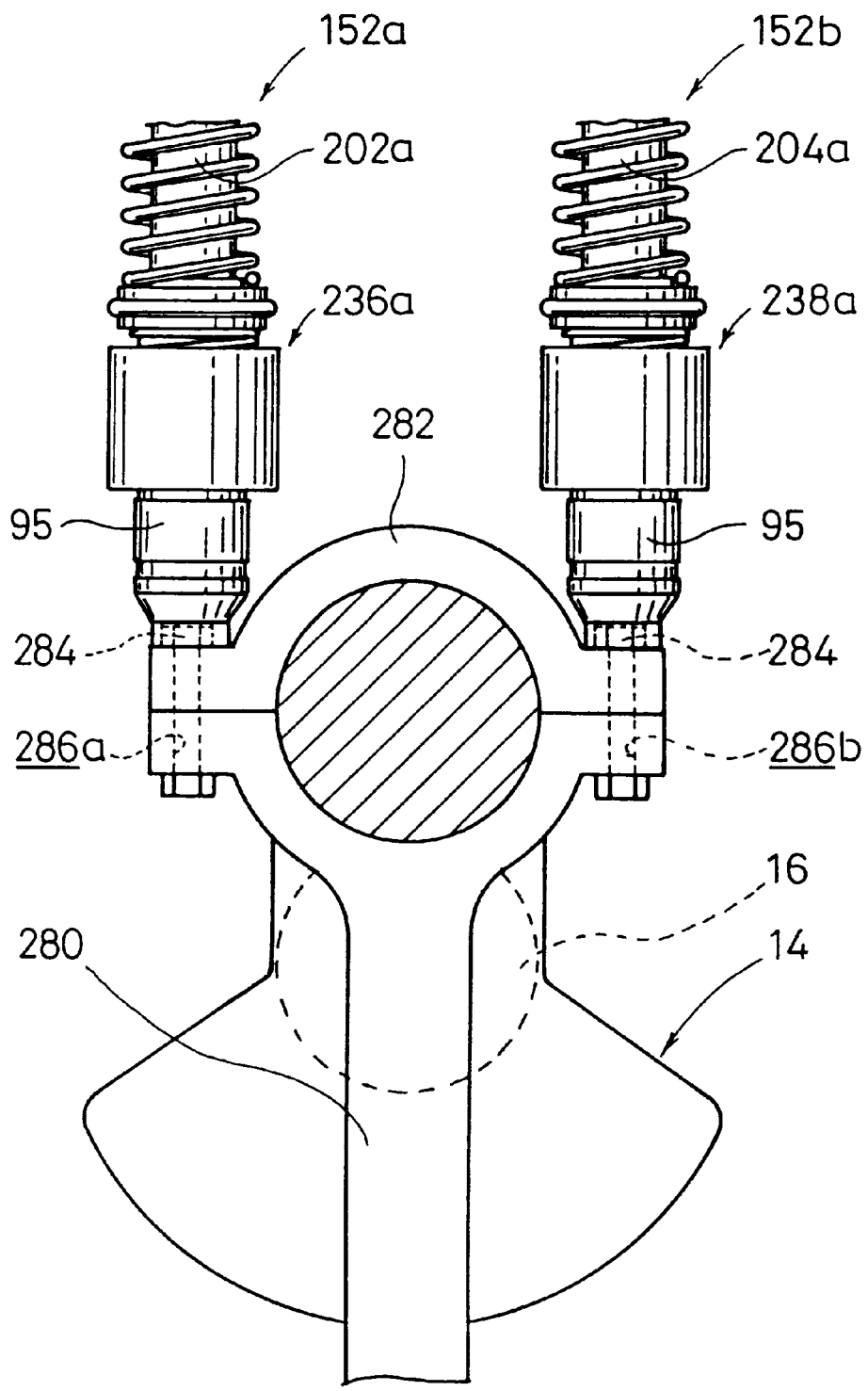
FIG. 12 shows a state of use of the tightening apparatus shown in FIG. 1, illustrating a partially magnified front view in which connecting rod bolts are installed to a crankshaft of an L-type engine.

As shown in FIG. 12, a connecting rod 280 and a connecting rod cap 282 are installed to the crankshaft 14. Connecting rod bolts 284 as the connecting rod attachment members are inserted into screw holes 286a, 286b defined through the connecting rod 280 and the connecting rod cap 282.

Next, the cylinder 43 of the rotating mechanism 20 is operated to displace the engaging member 46 in the direction of the arrow A by the aid of the spline shaft 35 and the rod member 42. The first end of the shaft section 16 of the crankshaft 14 is inserted and fitted into the hole 46a of the engaging member 46 (see FIG. 5). The cylinder 80 of the support mechanism 70 is operated to displace the displacement member 78 in the direction of the arrow B. The engaging member 84 is engaged with the second end of the shaft section 16 of the crankshaft 14 (FIG. 2). Accordingly, the crankshaft 14 is rotatably supported by the engaging members 46, 84. When the length of the shaft section 16 differs depending on the type of the engine, any crankshaft 14 having a different length can be rotatably supported by the engaging members 46, 84 by adjusting the amounts of displacement of the cylinder 43 and the cylinder 80.

When the crankshaft 14 is rotatably supported by the engaging members 46, 84, the engaging pawl 48 of the engaging member 46 is fitted to a key groove 16a which is formed at the shaft section 16. Thus, the shaft section 16 is positioned with respect to the circumferential direction. At this time, the end 48a of the engaging pawl 48 approaches the proximity switch 62 as shown by solid lines in FIG. 5. Accordingly, it is detected that the crankshaft 14 is in the locked state.

Once the shaft section 16 is engaged with the engaging member 46, the cylinder 56 is operated to displace the lock member 50 in the direction of the arrow A so that the engaging pawl 48 and the key groove 16a are prevented from disengagement from the fitted state.

Next, the sockets 95 corresponding to the type of the engine are selected from the plurality of sockets 95 supported on the socket-holding unit 92, and they are installed to the chucks 236a, 236b, 238a, 238b of the nut runners 152a to 152d. In this process, at first, the servomotors 138a, 138b of the axial displacement mechanisms 133a, 133b are operated to displace the inter-axis displacement mechanisms 150a, 150b in the direction of the arrow A (see FIGS. 1 and 3) so that the nut runners 152a to 152d are displaced to the positions over the socket-holding unit 92.

Explanation will be made below for the nut runners 152a, 152b with reference to FIGS. 7 and 8. Detailed explanation will be omitted for the nut runners 152c, 152d, because they are subjected to the same operation as that for the nut runners 152a, 152b.

Figure 10:
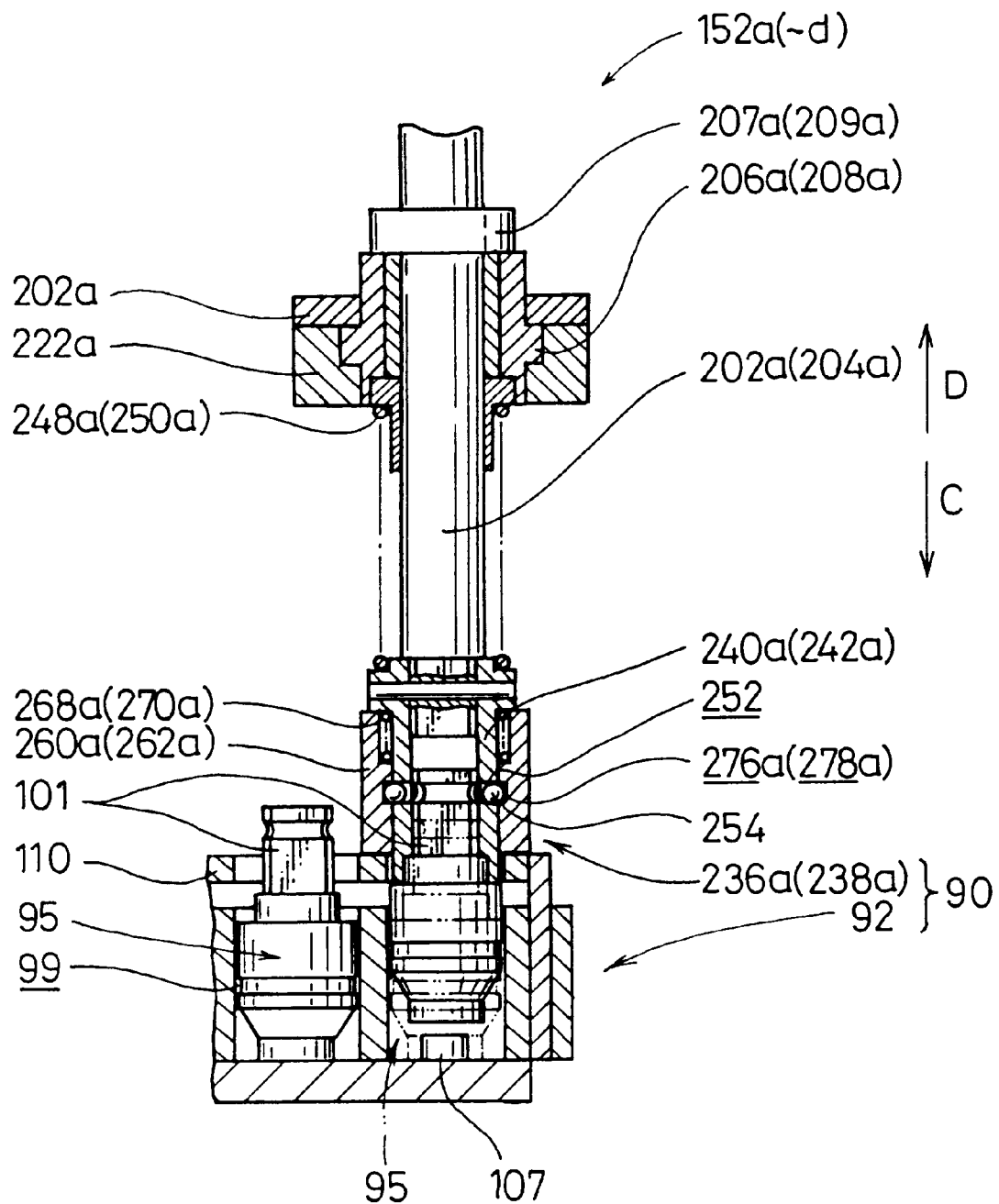
FIG. 10 shows a state of use of the socket exchange mechanism shown in FIG. 7, illustrating a partially magnified, vertical cross-sectional view in which a collar member is deflected with respect to a fitting member.

When the cylinder 230a is operated to displace the holding plate 222a in the direction of the arrow C, the lower ends of the collar members 260a, 262a of the chucks 236a, 238a abut against the disengaging member 110. Thus, the collar members 260a, 262a make relative upward displacement with respect to the fitting members 240a, 242a in opposition to the resilient force of the coil springs 268a, 270a (see FIG. 10). Accordingly, the holes 252 of the fitting members 240a, 242a communicate with the grooves 276a, 278a of the collar members 260a, 262a. The ball members 254 become movable between the holes 252 and the grooves 276a, 278a. At this time, the socket 95 is placed on the socket-holding unit 92 as shown by two-dot chain lines in FIG. 10, and it is not installed to the chuck 236a, 238a.

Figure 11:
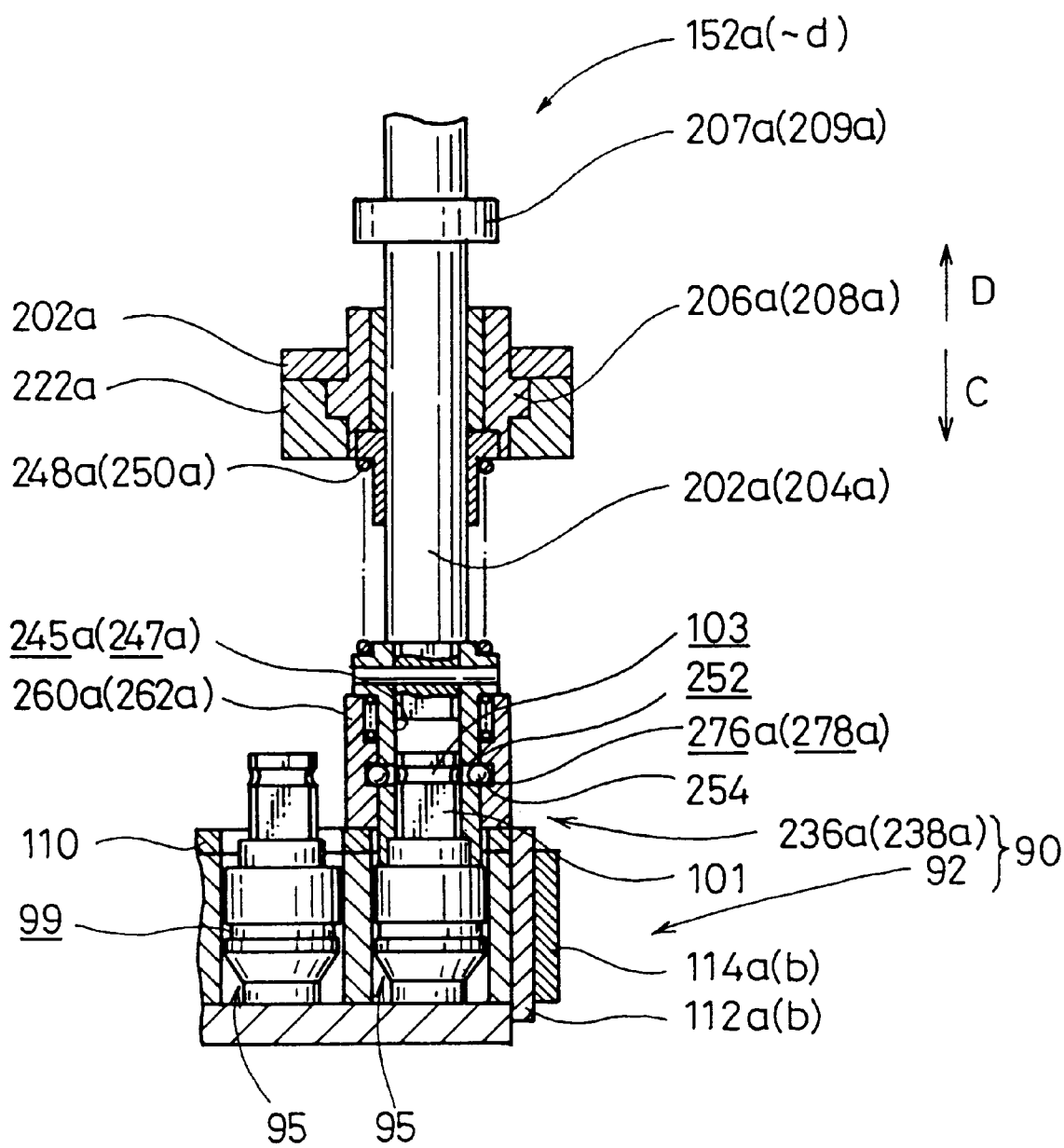
FIG. 11 shows a state of use of the socket exchange mechanism shown in FIG. 7, illustrating a partially magnified, vertical cross-sectional view in which a socket is installed to the fitting member.

After that, when the cylinder 106 of the socket-holding unit 92 is operated to displace the disengaging member 110 in the direction of the arrow C (see FIG. 6), the fitting section 101 of the socket 95 is fitted to the hole 245a, 247a of the fitting member 240a, 242a. The ball members 254 are fitted to the groove 103 defined on the fitting section 101 (see FIG. 11). When the cylinder 230a is operated to displace the holding plate 222a in the direction of the arrow D (see FIG. 8), the collar member 260a, 262a is displaced in the direction of the arrow C relatively with respect to the fitting member 240a, 242a in accordance with the resilient force of the coil spring 268a, 270a. The communication between the groove 276a, 278a and the hole 252 is intercepted. The ball members 254 protrude inwardly from the hole 252 to be fixed in a state of being fitted to the groove 103 of the socket 95 (see FIG. 7). Accordingly, the socket 95 is prevented from disengagement from the fitting member 240a, 242a by the aid of the ball members 254.

After the sockets 95 are installed to the nut runners 152a to 152d as described above, the connecting rod is tightened to the crankshaft 14. At first, the servomotor 26 of the rotating mechanism 20 is operated to deflect the crankshaft 14 at a predetermined angle (see FIG. 5). Subsequently, the linear actuators 128a, 128b of the angular deflecting mechanisms 30a, 30b are operated to rotate the arm members 32, 33, 122, 124 so that the nut runners 152a to 152d are deflected by predetermined angles with respect to the crankshaft 14 (see FIGS. 1 to 4). During this process, the center of rotation of the arm members 32, 33 is coaxial with the engaging member 46, and the center of rotation of the arm members 122, 124 is coaxial with the engaging member 84. Therefore, the arm members 32, 33; 122, 124 are rotated about the center of the shaft section 16 of the crankshaft 14 rotatably supported by the engaging members 46, 84. In the case of a crankshaft of the L-type engine, the arm members 32, 33, 122, 124 are rotated to position the axes of the nut runners 152a to 152d so that they extend in the vertical direction as shown by solid lines in FIG. 4. On the other hand, in the case of a crankshaft of the V-type engine, the arm members 32, 33, 122, 124 are rotated so that the nut runners 152a, 152b are deflected with respect to the nut runners 152c, 152d by a predetermined angle as shown by two-dot chain lines in FIG. 4.

Subsequently, when the servomotors 138a, 138b of the axial displacement mechanisms 133a, 133b are operated to rotate the ball screws 136a, 136b, the displacement members 144a, 140b are displaced in the direction of the arrow A or B (see FIG. 3). Once the nut runners 152a to 152d are displaced to the positions for tightening the connecting rod bolts, the rotation of the servomotors 138a, 138b is stopped.

Next, the inter-axis displacement mechanisms 150a, 150b are used to adjust the distance between the nut runners 152a, 152b and the distance between the nut runners 152c, 152d so that they are equal to the distance between the screw holes 286a, 286b to which the pair of connecting rod bolts 284 are fastened (see FIG. 12). In this process, when the servomotor 170a for the inter-axis displacement mechanism 150a, 150b is operated to rotate the ball screw 172a, the plate-shaped member 168a is displaced together with the servomotor 170a in the direction of the arrow C or D, because the displacement member 174a is secured to the holding plate 160a (see FIG. 9). Accordingly, the cam plate 176a, which is secured to the plate-shaped member 168a, is displaced in the direction of the arrow C or D. The cam members 182a, 184a are guided by the wall sections of the cam holes 178a, 180a, and the guide members 186a, 188a are displaced in the direction of the arrow E or F along the guide bars 190a, 192a. Therefore, the nut runners 152a, 152b, which are secured to the guide member 186a, 188a respectively, make mutual approach or separation. Once the nut runners 152a, 152b are disposed at a predetermined distance, the servomotor 170a is stopped.

Subsequently, when the cylinder 230a is operated to displace the holding plate 222a in the direction of the arrow C (see FIG. 8), then the chucks 236a, 238a are lowered together with the guide members 206a, 208a, and the recesses 105 of the sockets 95 are engaged with the heads of the connecting rod bolts 284 (see FIG. 12). When the nut runners 152a, 152b are operated, then the rotary shafts 202a, 204a are rotated, and the connecting rod bolts 284 are fastened by the aid of the sockets 95.

During this process, the force in the direction of the arrow G, which is caused by the reaction generated when the connecting rod bolts 284 are fastened, is applied to the inter-axis displacement mechanism 150a via the nut runners 152a, 152b (see FIG. 4). However, the inter-axis displacement mechanism 150a is supported by the two rail members 158a, 158c and the two guide members 156a, 156c. Therefore, the inter-axis displacement mechanism 150a is not deflected in the direction of the arrow G, and there is no fear for occurrence of any error concerning the positions of the nut runners 152a, 152b. This fact is also true for the inter-axis displacement mechanism 150b.

The connecting rod bolts 284 are fastened to the connecting rod 280 and the connecting rod cap 282 of the crankshaft 14 as described above. After that, the cylinder block 15 is conveyed to the next step along the conveyer rails 13.

Figure 13:
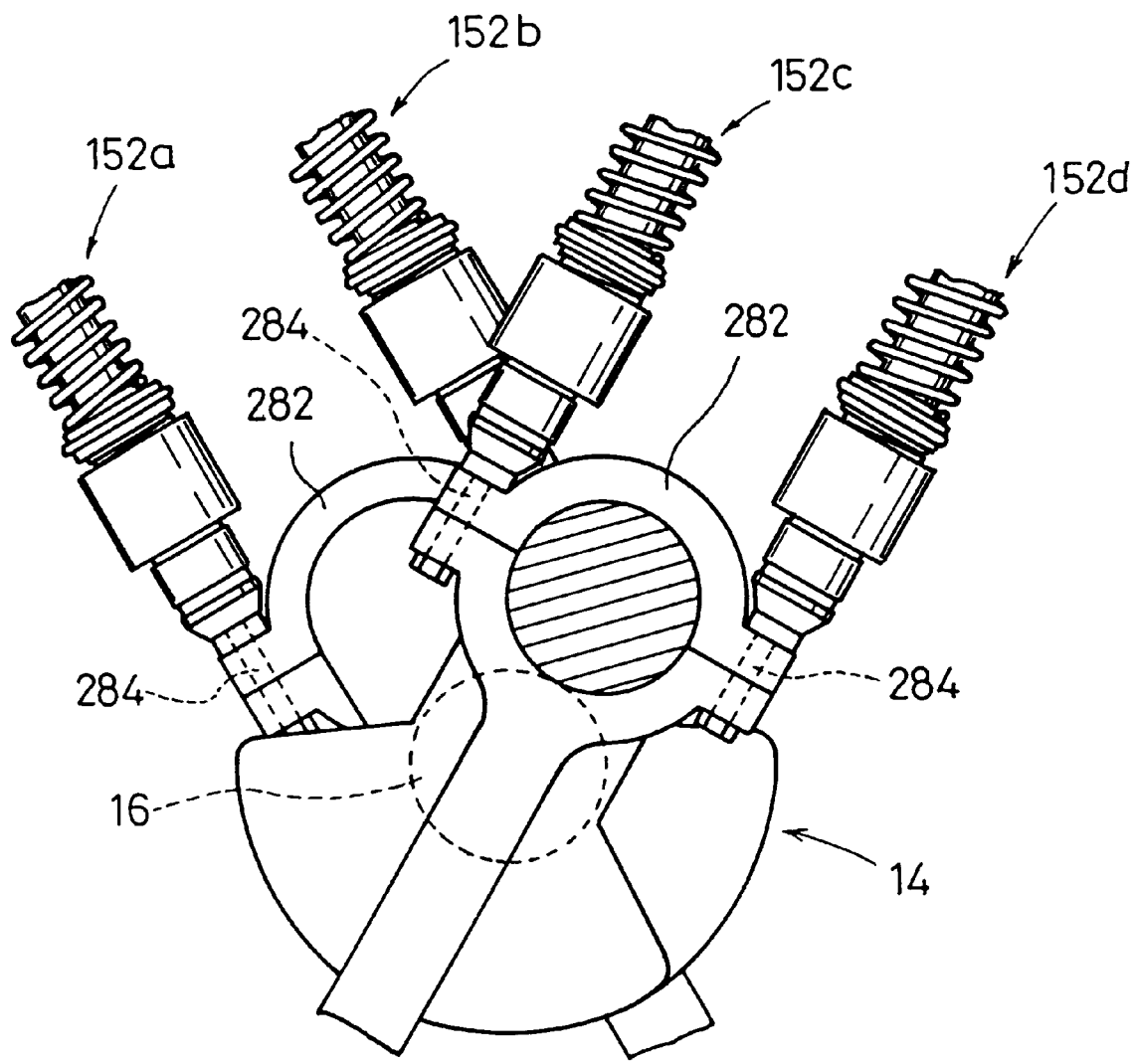
FIG. 13 shows a state of use of the tightening apparatus shown in FIG. 1, illustrating a partially magnified front view in which connecting rod bolts are installed to a crankshaft of a V-type engine.

FIG. 12 is illustrative of the crankshaft 14 of the L-type engine. When the V-type engine is used as shown in FIG. 13, the connecting rod 280 is fastened to the crankshaft 14 such that the first pair of nut runners 152a, 152b and the second pair of nut runners 152c, 152d are deflected by the predetermined angles.

As described above, according to the apparatus 10 for tightening connecting rod attachment members concerning the present invention, the connecting rod 280 can be fastened to the crankshaft 14 regardless of the type of the engine. It is unnecessary to change the tightening apparatus 10 even when the type of the engine supplied to the production line is changed. The tightening apparatus 10 can be used for the production line for carrying multiple types in a mixed manner. Therefore, any exclusive production line for each type is unnecessary, and thus the production efficiency is improved.

The tightening apparatus 10 includes the plurality of angular deflecting mechanisms 30a, 30b. Each of the angular deflecting mechanisms 30a, 30b is provided with the axial displacement mechanisms 133a, 133b having the pairs of nut runners 152a to 152d. Therefore, a plurality of pairs of connecting rods 280 can be simultaneously fastened. Accordingly, the operation time is shortened, and the production efficiency is further improved.

What is claimed is:

1. An apparatus for tightening connecting rod attachment members, comprising:

a rotating mechanism for supporting a crankshaft and rotating and positioning said crankshaft about a center of its shaft section;

a pair of nut runners for tightening a connecting rod with respect to said crankshaft;

an axial displacement mechanism for displacing said pair of nut runners along an axial direction of said crankshaft;

an angular deflecting mechanism for rotating said pair of nut runners about said center of said shaft section of said crankshaft by a predetermined angle;

an inter-axis displacement mechanisms for displacing said pair of nut runners in a direction to make mutual approach or separation; and a socket exchange mechanism for exchanging sockets of said nut runners.

2. The apparatus for tightening connecting rod attachment members according to claim 1, wherein said nut runners are provided as a plurality of pairs, and said angular deflecting mechanism, said axial displacement mechanism, and said inter-axis displacement mechanism are provided for each pair of said nut runners.

3. The apparatus for tightening connecting rod attachment members according to claim 1, wherein said angular deflecting mechanism further comprises:

arm members for supporting said pair of nut runners, said arm members being rotatable coaxially with said crankshaft; and an arm-deflecting mechanism for deflecting said arm members.

4. The apparatus for tightening connecting rod attachment members according to claim 3, wherein said arm-deflecting mechanism Includes a servomotor rotatably attached to a table on which said tightening apparatus is disposed, and a ball screw rotatably supported by said arm members for making forward or backward movement in accordance with operation of said servomotor, and wherein said arm members are deflected in accordance with said forward or backward movement of said ball screw by operating said servomotor.

5. The apparatus for tightening connecting rod attachment members according to claim 3, wherein said axial displacement mechanism is provided on said arm members so that said pair of nut runners are displaced with respect to said arm members.

6. The apparatus for tightening connecting rod attachment members according to claim 1, wherein said inter-axis displacement mechanism comprises:

cam members provided for said pair of nut runners respectively;

a cam plate defined with cam holes for engaging with said cam members respectively; and a cam displacement mechanism for displacing said cam plate in an axial direction of said nut runners, and wherein:

said cam plate is displaced in accordance with operation of said cam displacement mechanism so that said nut runners are displaced in a direction to make mutual approach or separation by the aid of said cam members.

7. The apparatus for tightening connecting rod attachment members according to claim 1, wherein said rotating mechanism comprises:

an engaging member for engaging with an end of said shaft section of said crankshaft; and a rotary driving source for rotating said engaging member, and wherein:

said crankshaft is positioned at a certain circumferential angle by operating said rotary driving source to rotate said engaging member by a predetermined angle.

8. The apparatus for tightening connecting rod attachment members according to claim 7, wherein said engaging member is provided with an engaging pawl capable of engaging with a key groove formed at said shaft section of said crankshaft, and a lock member for maintaining a state of engagement of said engaging pawl with said key groove.

9. The apparatus for tightening connecting rod attachment members according to claim 1, wherein said socket exchange mechanism comprises:

chucks provided on said pair of nut runners for holding said sockets for fastening said connecting rod attachment members;

fitting members provided on said chucks for preventing said sockets from disengagement;

a socket-holding unit for holding said plurality of sockets; and a disengaging member provided on said socket-holding unit for disengaging a fitted state of said sockets effected by said fitting members.

10. The apparatus for tightening connecting rod attachment members according to claim 9, wherein said fitting members are provided with ball members for being inserted into holes formed in said fitting members, and said ball members protrude to the inside of said fitting members in accordance with displacement of collar members for inserting said fitting members thereinto so that said ball members are fitted to grooves formed on said sockets, and thus said sockets are installed to said fitting members.

* * * * *